United States Patent
Longhi et al.

(10) Patent No.: US 10,669,018 B2
(45) Date of Patent: *Jun. 2, 2020

(54) MULTICOPTER WITH BOOM-MOUNTED ROTORS

(71) Applicant: Kitty Hawk Corporation, Mountain View, CA (US)

(72) Inventors: Aldo Daniele Longhi, Los Gatos, CA (US); Todd Reichert, Mountain View, CA (US); Cameron Robertson, San Mateo, CA (US); Joseph Roop, Sunnyvale, CA (US); Christopher Scott Saunders, San Jose, CA (US); Zachais Vawter, Sunnyvale, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/209,817

(22) Filed: Dec. 4, 2018

(65) Prior Publication Data

US 2019/0106211 A1    Apr. 11, 2019

Related U.S. Application Data

(63) Continuation of application No. 15/249,074, filed on Aug. 26, 2016, now Pat. No. 10,183,747.

(51) Int. Cl.
| | |
|---|---|
| *B64C 27/08* | (2006.01) |
| *B64C 25/54* | (2006.01) |
| *B64C 39/02* | (2006.01) |
| *B64C 1/06* | (2006.01) |
| *B64C 13/18* | (2006.01) |
| *B64C 25/32* | (2006.01) |

(52) U.S. Cl.
CPC .............. *B64C 27/08* (2013.01); *B64C 1/061* (2013.01); *B64C 13/18* (2013.01); *B64C 25/54* (2013.01); *B64C 39/024* (2013.01); *B64C 2025/325* (2013.01); *B64C 2201/027* (2013.01); *B64C 2201/042* (2013.01); *B64C 2201/08* (2013.01)

(58) Field of Classification Search
CPC ....... B64C 35/00; B64C 25/54; B64C 39/026; B64C 2201/027
See application file for complete search history.

(56) References Cited

U.S. PATENT DOCUMENTS

| | | | |
|---|---|---|---|
| 2,953,321 A | 9/1960 | Robertson | |
| 3,184,183 A | 5/1965 | Plasecki | |
| 4,451,016 A * | 5/1984 | Genovese | ............... B64C 25/56 244/107 |

(Continued)

*Primary Examiner* — Richard G Davis
(74) *Attorney, Agent, or Firm* — Van Pelt, Yi & James LLP

(57) ABSTRACT

A multicopter with boom mounted rotors is disclosed. In various embodiments, a multicopter includes multiple rotors, each mounted substantially horizontally on a distal end of a boom. The multicopter further includes a plurality of boom extensions, each boom extension being associated with a corresponding boom and each boom extension being configured to extend an associated distal end of said corresponding boom by an amount determined based at least in part on a swept area associated with a rotor mounted at or near said associated distal end. The multicopter includes a material, such as netting, secured to the aircraft and of a size sufficient to reach a far end of one or more of said boom extensions.

20 Claims, 8 Drawing Sheets

(56) References Cited

U.S. PATENT DOCUMENTS

| | | | |
|---|---|---|---|
| 4,655,415 A | 4/1987 | Miller | |
| 9,902,491 B2* | 2/2018 | Chan | B64C 27/08 |
| 9,946,267 B2 | 4/2018 | Youmans | |
| 2002/0125368 A1* | 9/2002 | Phelps, III | B64C 27/10 |
| | | | 244/17.23 |
| 2005/0230524 A1 | 10/2005 | Ishiba | |
| 2006/0226281 A1* | 10/2006 | Walton | B64C 27/20 |
| | | | 244/17.23 |
| 2009/0008499 A1* | 1/2009 | Shaw | B64C 27/20 |
| | | | 244/17.23 |
| 2012/0032032 A1 | 2/2012 | De Roche | |
| 2015/0379876 A1* | 12/2015 | Navot | G08G 5/0021 |
| | | | 701/301 |
| 2016/0101850 A1 | 4/2016 | Lin | |
| 2016/0244162 A1 | 8/2016 | Weller | |
| 2016/0311526 A1* | 10/2016 | Geise | B64C 27/08 |
| 2016/0340035 A1 | 11/2016 | Duru | |
| 2016/0375982 A1* | 12/2016 | Rifenburgh | B64C 27/56 |
| | | | 244/17.19 |
| 2017/0029106 A1 | 2/2017 | Chang | |
| 2017/0043870 A1* | 2/2017 | Wu | B64C 27/08 |
| 2017/0185084 A1* | 6/2017 | Wang | G05D 1/0088 |
| 2018/0002001 A1 | 1/2018 | Daniel, Sr. | |
| 2018/0319496 A1* | 11/2018 | Zhang | B64C 39/024 |

* cited by examiner

MULTICOPTER WITH BOOM-MOUNTED ROTORS

CROSS REFERENCE TO OTHER APPLICATIONS

This application is a continuation of U.S. patent application Ser. No. 15/249,074 entitled MULTICOPTER WITH BOOM-MOUNTED ROTORS filed Aug. 26, 2016, now U.S. Pat. No. 10,183,747, which is incorporated herein by reference for all purposes.

BACKGROUND OF THE INVENTION

Small scale, lightweight, and personal aircraft have been described. For example, some have imagined small aircraft used routinely for personal transportation, such as to get to and from work or school, and/or for entertainment.

Unlike unmanned aircraft, such as drones, occupant safety is a significant concern in the case of a manned aircraft. In addition, the ability to store and/or transport a personal aircraft may become a design consideration. For example, a personal aircraft may need to be transported by ground, e.g., in a trailer or on a truck bed, to be taken to a location from which the aircraft can safely take off and land.

BRIEF DESCRIPTION OF THE DRAWINGS

Various embodiments of the invention are disclosed in the following detailed description and the accompanying drawings.

DETAILED DESCRIPTION

Figure 1:
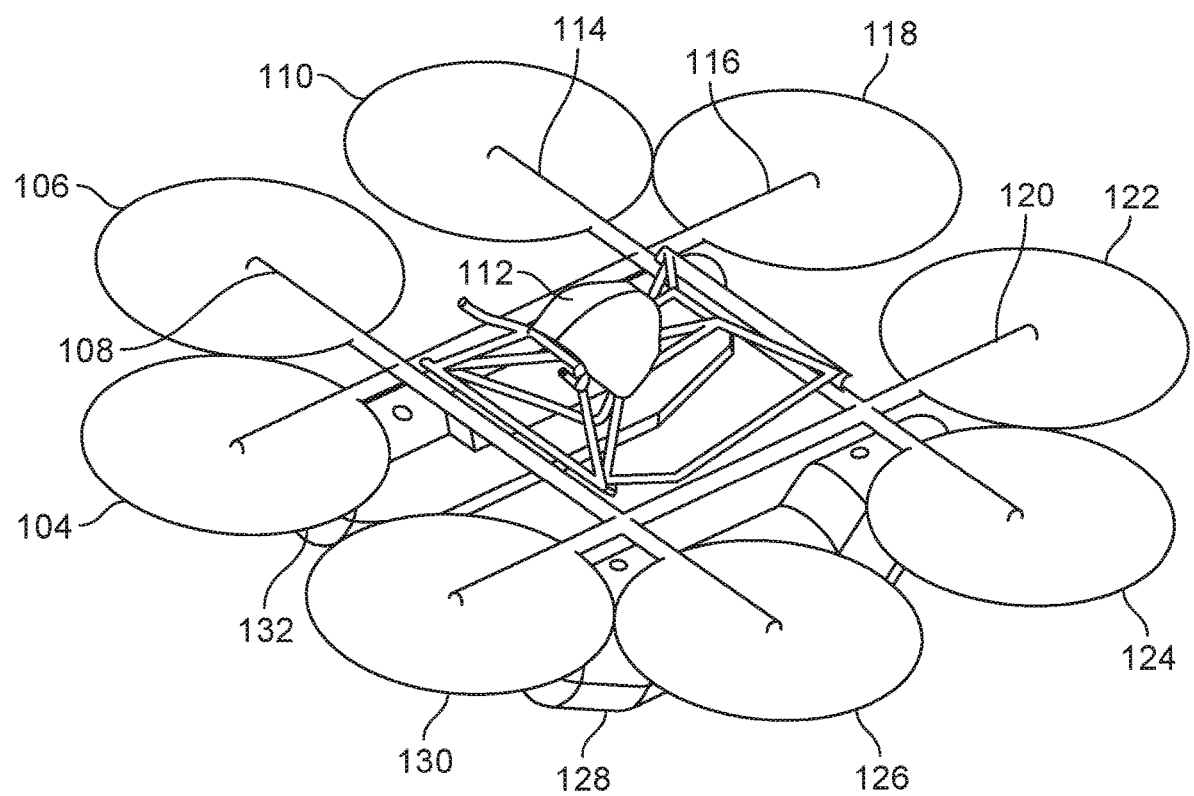
FIG. 1 is a diagram illustrating an embodiment of a multicopter with flotation landing gear.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A multicopter aircraft is disclosed. In various embodiments, the multicopter aircraft comprises multiple rotors, each mounted substantially horizontally on or near a distal end of a boom, i.e., an end of the boom that extends away from a central point, axis, fuselage, and/or other structure of the aircraft. The multicopter aircraft comprises a plurality of boom extensions, each boom extension being associated with a corresponding boom and each boom extension being configured to extend an associated end of said corresponding boom by an amount determined based at least in part on a swept area associated with a rotor mounted at or near said associated end. The aircraft additionally comprises a net or other non-rigid protective material (e.g., sailcloth, tarp) secured to said aircraft and having an outer free (unsecured) portion of a size sufficient to reach a far end of one or more of said boom extensions.

In various embodiments, the net or other material extended over said boom extensions provides a barrier between an occupant/user of the multicopter aircraft and said rotors, decreasing the likelihood that the occupant/user will come in contact with said rotors.

In some embodiments, the multicopter aircraft comprises four booms with a rotor attached at the two ends of each boom. Two booms may be arranged on top of and perpendicular to another two booms. A body of the aircraft may be positioned in the center of all four booms. Flotation devices may be attached underneath the booms. Boom extensions may extend the booms past the rotors. A net or multiple nets may be secured to ends of the boom extensions, covering the rotors. The aircraft may be designed to have a small form factor such that it can be easily transported when it is not flown. The aircraft may be designed for flight over water. The aircraft may be designed to crash safely without harming a pilot of the aircraft.

FIG. 1 is a diagram illustrating an embodiment of a multicopter with flotation landing gear. In the example shown, boom 108 and boom 114 are in parallel. Booms 116 and 120 are in parallel. Booms 108 and 114 are perpendicular to booms 116 and 120. In some embodiments, a fuselage of the aircraft is enclosed by two parallel booms and two perpendicular booms. In the example shown, fuselage 112 is attached to booms 108, 114, 116, and 120. In some embodiments, multiple rotors surround a fuselage of the aircraft. Rotors 106 and 126 are attached to either end of boom 108. Rotors 110 and 124 are attached to either end of boom 114. Rotors 118 and 104 are attached to either end of boom 116. Rotors 122 and 130 are attached to either end of boom 120. Flotation device 128 is attached underneath boom 116.

Flotation device 132 is attached underneath boom 120. In some embodiments, the aircraft comprises two flotation devices wherein the span between the two flotation devices depends on the distance between the two parallel booms the flotation devices are attached to. In some embodiments, boom 108, 114, 116, and 120 are arranged such that fuselage 112 is a square or rectangular shaped space in the middle of the booms. The fuselage may comprise metal tubing used to build a frame to support and stabilize a seat, steering bar, batteries, and any other appropriate components.

In some embodiments, fuselage 112 comprises a seat and a steering mechanism. The seat and steering mechanism may be designed for a human pilot. The fuselage may be uncovered. The absence of a covered or enclosed fuselage may be due to weight constraints. An open fuselage may allow a pilot greater visibility while flying over water. For example, mist and splashes from a water may hinder visibility to a greater degree in an enclosed fuselage. The fuselage may comprise a flight computer. The flight computer may implement autopilot safety features. For example, the flight computer may prevent the aircraft from tilting past a threshold angle, such as twenty degrees, in order to limit crashes. The flight computer may use sensors to prevent the aircraft from colliding with obstacles. The flight computer may be an off the shelf model such as a Pixhawk product.

In some embodiments, the multicopter aircraft has a length of 100 inches or less. The multicopter aircraft may qualify as an ultralight aircraft under federal aviation regulation guidelines. The multicopter aircraft may fit in a standard trailer designed to be towed by an automobile. In some embodiments, the aircraft is designed to be flown over water and as such does not have attached wheels. A small form factor may allow the aircraft to be easily towed over land. The multicopter may be designed to fit sideways in the trailer such that the width of the aircraft is relatively unconstrained in comparison to its length. For example, the four rotors on either side of the aircraft (e.g. rotors 106, 110, 126, and 124) may be larger than the other four rotors of the aircraft. The aircraft may be wider than it is long in order to have an increased wingspan and increased flight efficiency.

Figure 2:
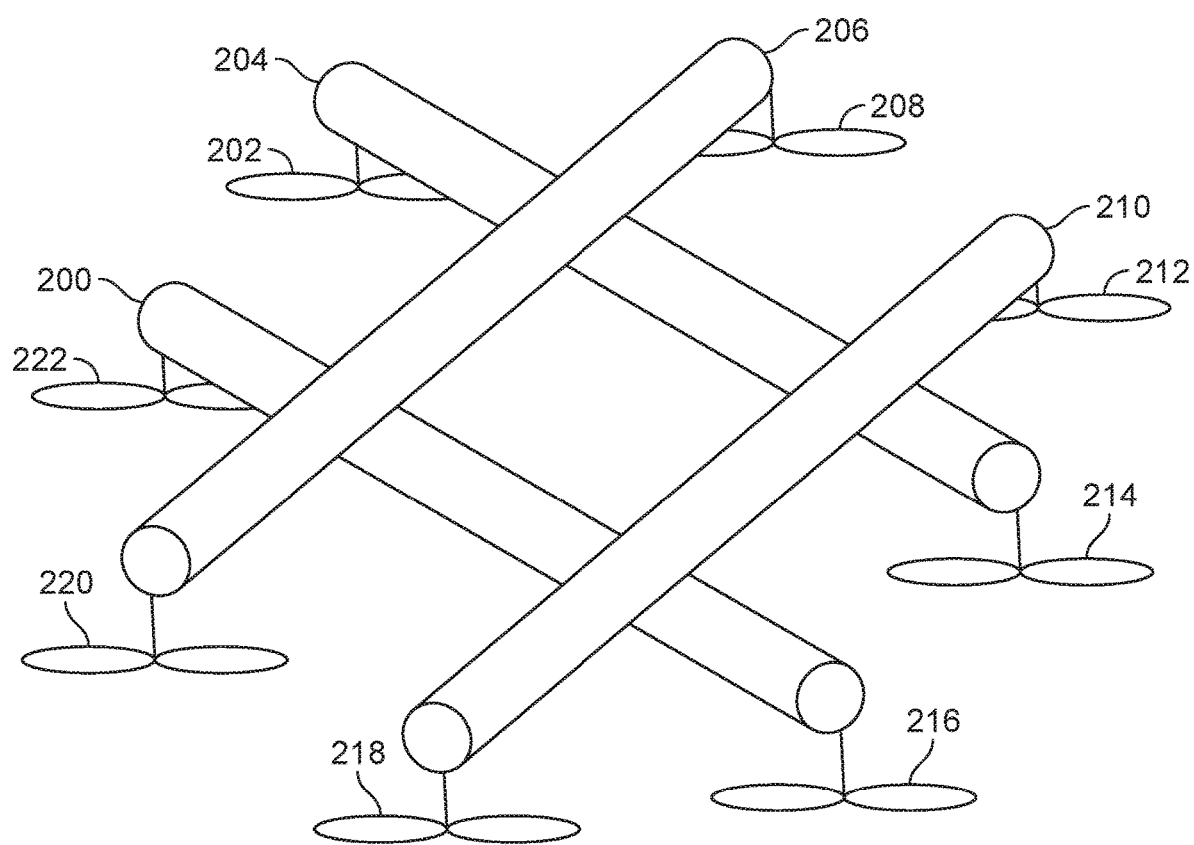
FIG. 2 is a block diagram illustrating an embodiment of booms and rotors of a multicopter with flotation landing gear.

FIG. 2 is a block diagram illustrating an embodiment of booms and rotors of a multicopter with flotation landing gear. In some embodiments, the aircraft comprises two parallel booms and two booms perpendicular to the two parallel booms, wherein the two parallel booms are attached to the two perpendicular booms. In the example shown, boom 200 and boom 204 are in parallel. Booms 206 and 210 are perpendicular to booms 200 and 204. In various embodiments, perpendicular booms are attached using adhesives, screws, welding, reinforced joints, interlocking parts, or any other appropriate method. In the example shown, a rotor is attached at both ends of each boom. In some embodiments, the rotors are attached to an underside of the booms. The booms used may be hollow. The booms may be made of a lightweight, strong material. The boom may have a diameter of 2 inches or length of 88 inches. The booms may be water resistant. In the example shown, rotors 222 and 216 are attached to each end of boom 200. Rotors 202 and 214 are attached to each end of boom 204. Rotors 220 and 208 are attached to each end of boom 206. Rotors 218 and 212 are attached to each end of boom 210. In some embodiments, motors used are an off the shelf variety such as A200-8 Hacker Brushless motors.

Figure 3:
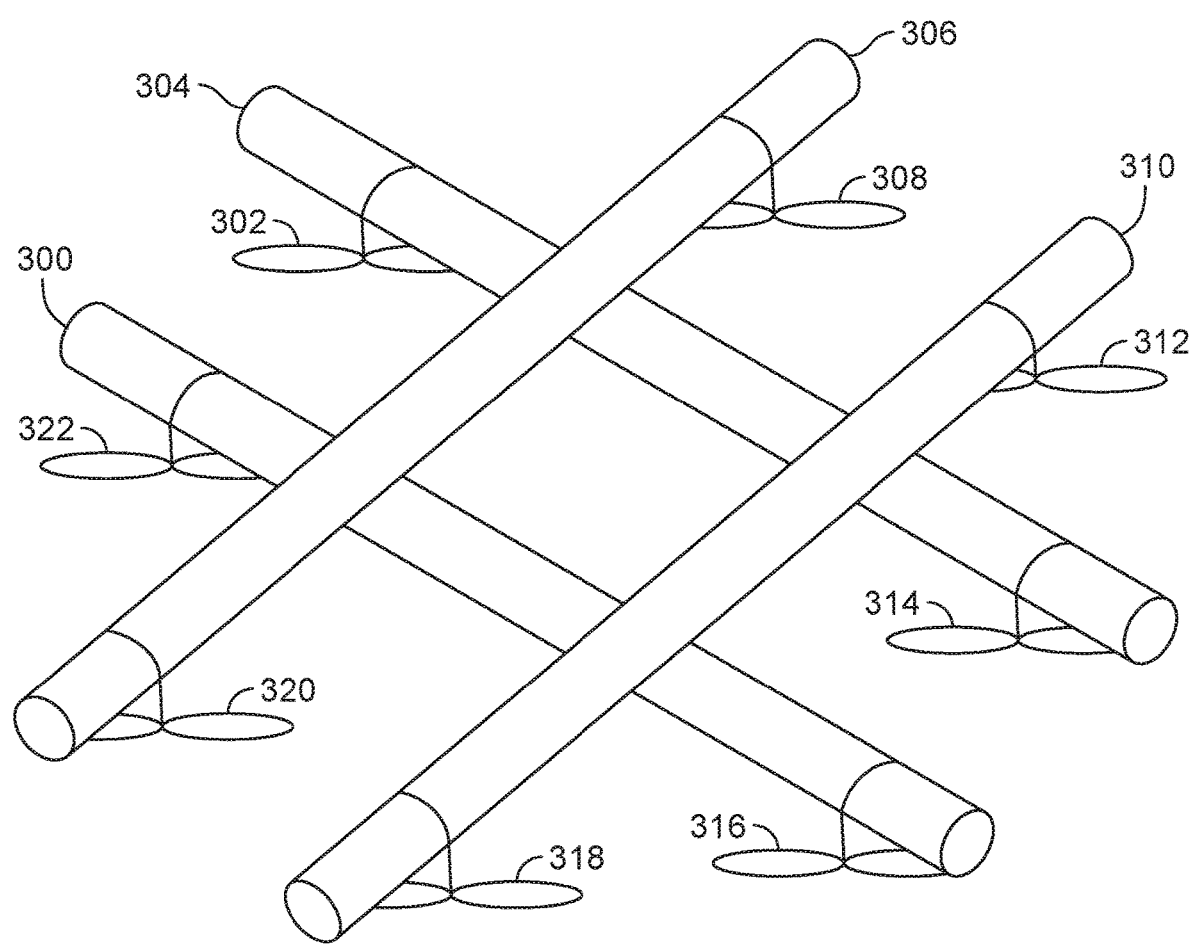
FIG. 3 is a diagram illustrating an embodiment of booms and rotors of a multicopter with flotation landing gear.

FIG. 3 is a diagram illustrating an embodiment of booms and rotors of a multicopter with flotation landing gear. In the example shown, boom extensions have been deployed to all boom ends. In the example shown, the boom extensions extend past the rotors. In some embodiments, a length of the boom extensions is based upon a rotor swept area. For example, a boom extension may be designed to extend the boom a predetermined amount past the furthest reach of a rotor attached to the boom. The boom extension length may be equal to the sum of the radius of the rotor's swept area and an additional safeguard distance. In some embodiments, the plurality of boom extensions are attached during flight and the plurality of boom extensions are removed when the aircraft is on land. In some embodiments, the boom extensions are telescoped in or out of the booms. The boom extensions may be extracted or retracted. The boom extensions may be removed or retracted to decrease the width and/or length of the aircraft, allowing it to be transported easily and compactly. In some embodiments, a rotor must be turned to be perpendicular to a boom it is attached to in order to transport the aircraft when the extensions are removed. Turning the rotor may prevent the rotor blade from becoming damaged or allow the aircraft to be transported in a smaller carrier than otherwise.

In the example shown, booms 306 and 310 are in parallel. Booms 300 and 304 are perpendicular to and attached to booms 306 and 310. Boom 304 originally extended at rotors 302 and 314 or at a short predetermined distance past the rotors (e.g. a few centimeters to a few inches). Boom extensions applied to boom 304 allow the boom to extend past the swept area of rotors 302 and 314. The swept area of a rotor may comprise the circular area that the rotor travels through when running. The boom may originally be a hollow tube and be open at both ends. The boom extensions may be hollow, open at one end, and closed at the other. The boom extension may be a tube of a greater or lesser diameter than the boom such that the open end of the boom extension and an end of the boom may be attached by sliding one tube into the other. A boom extension may plug into a boom up to a stopper or stopping point. A net or protective material may provide tension that holds the boom extensions in. The boom extensions may be always attached to the booms and be folded up when not in use. The boom extensions may be attached to the boom via screws, adhesives, interlocking parts, or any other appropriate method. The extensions may be installed before flight of the aircraft for safety reasons.

Figure 4:
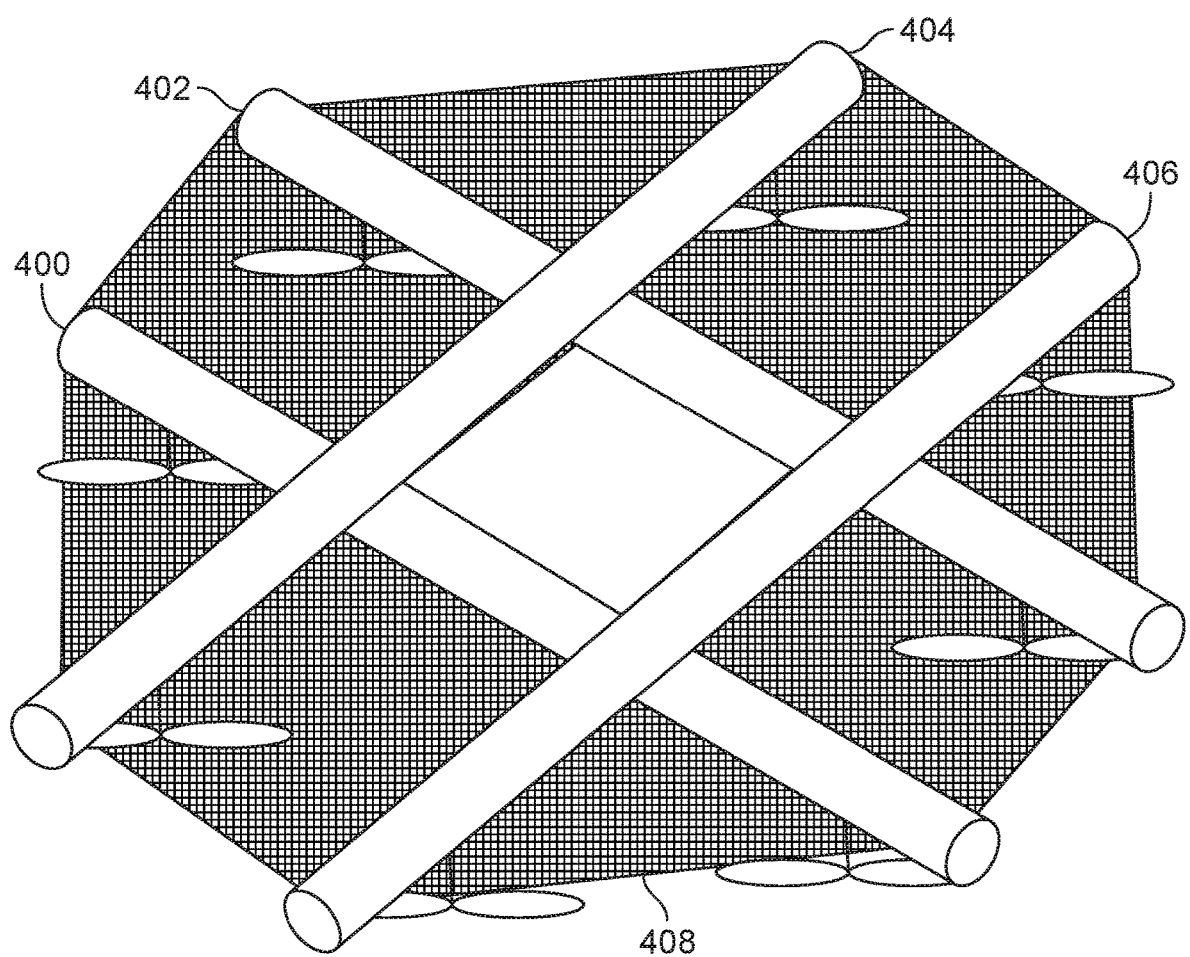
FIG. 4 is a block diagram illustrating an embodiment of booms, rotors, and protective material of a multicopter with flotation landing gear.

FIG. 4 is a block diagram illustrating an embodiment of booms, rotors, and protective material of a multicopter with flotation landing gear. In the example shown, booms 400 and 402 are in parallel. Booms 404 and 406 are in parallel and are perpendicular to booms 400 and 402. The booms have rotors and boom extensions attached at each end. Protective material 408 is attached. In some embodiments, protective material 408 is attached on top of the booms. In various embodiments, protective material 408 comprises netting, a tarp, a cloth, or any appropriate material. Protective material 408 may prevent an entity positioned above the rotors from being injured by blades of the rotors. Protective material 408 may be flexible, durable, or lightweight. In some embodiments, protective material 408 is able to be rolled or folded. Protective material 408 has an opening near the center of the aircraft, where a fuselage may be positioned. The material may be configured such that the fuselage of the aircraft is not covered. The material may be attached to the booms near the fuselage and to each boom extension. The material may be attached via fasteners or any appropriate method that allows the material to be easily attached or removed. In some embodiments, the material extends over swept areas associated with the multiple rotors. The material may protect a pilot of the aircraft from being harmed by a rotor in the event of an accident. The material may prevent a pilot from being cut by a blade of a rotor in the event the pilot falls off a seat of the aircraft, especially in the event the fuselage is uncovered. In some embodiments, in the event the pilot falls off the aircraft, the aircraft senses the pilot is no longer seated and turns off power to the rotors or automatically lands the aircraft. A seatbelt may be attached to a pin in the aircraft such that in the event the pilot is thrown, the seatbelt detaches from the aircraft and pulls out the pin, signaling that an accident has occurred. The protective material may be removed when the aircraft is not being flown. Booms 400, 402, 404, and 406 may have fasteners at their ends such that material 408 is rolled up and attached to the booms in the event the boom extensions are removed.

Figure 5:
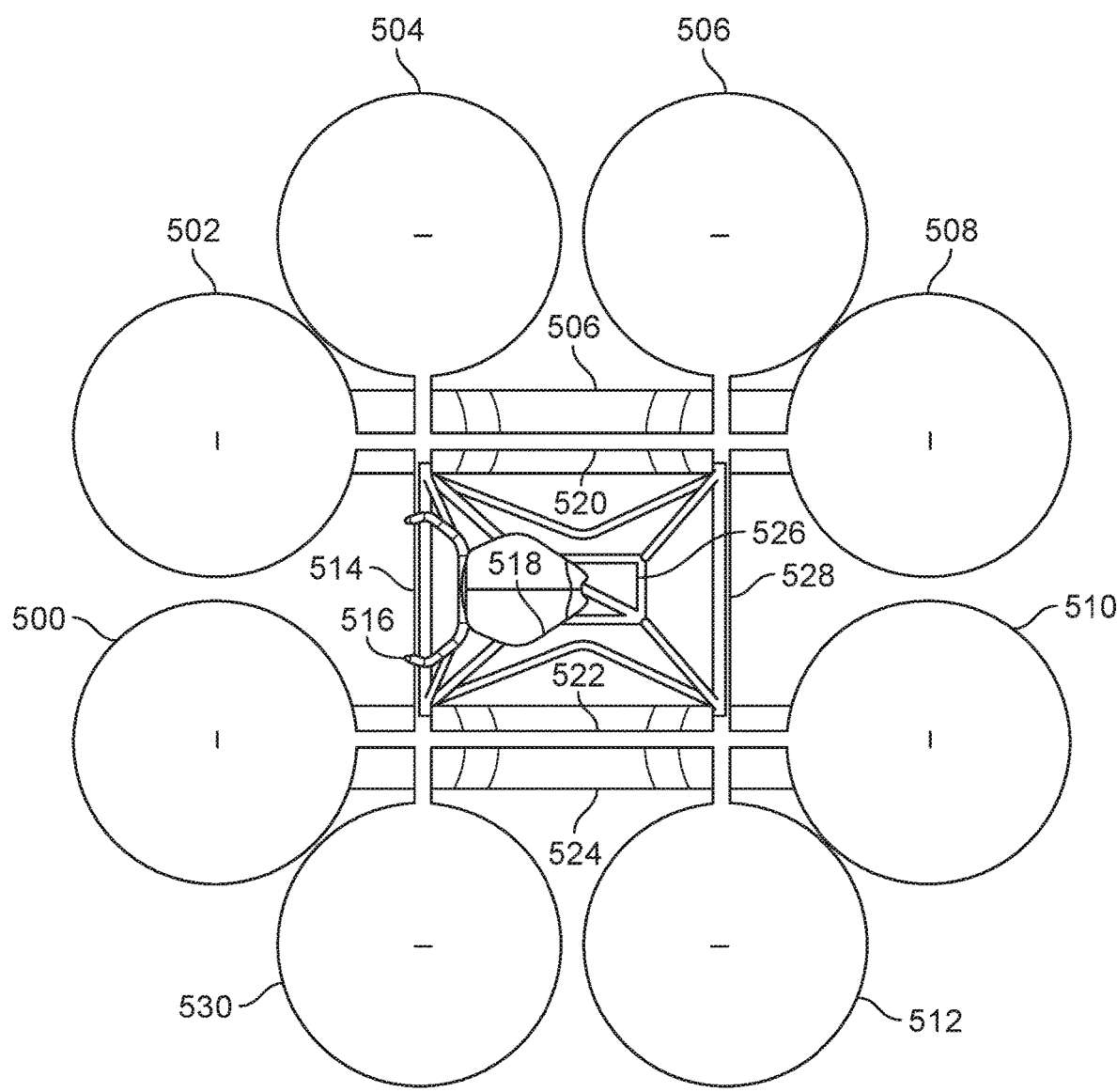
FIG. 5 is a diagram illustrating a top view of an embodiment of a multicopter with flotation landing gear.

FIG. 5 is a diagram illustrating a top view of an embodiment of a multicopter with flotation landing gear. In the example shown, booms 514, 522, 528, and 520 surround a fuselage of the aircraft. The fuselage comprises steering mechanism 516, structure 526, and tank 518. In some embodiments, steering mechanism 516 is rigid and is able to support a pilot's expected body weight (e.g. up to 250 pounds). In some embodiments, steering mechanism 516 comprises finger controls for the pilot. Structure 526 may be part of the frame on which a seat is fastened. In some embodiments, the seat of the aircraft is designed to be straddled. Tank 518 may contain fuel for the aircraft. Tank 518 may be designed for a pilot to secure her legs on either side, providing stability to the pilot. The fuselage may be attached to the booms via a frame made of metal tubes.

Flotation devices 506 and 524 may be attached underneath booms 520 and 522 respectively. In the example shown, rotors are represented by their swept areas. Rotors 500, 502, 504, 506, 508, 510, 512, and 5230 surround the fuselage. Using eight rotors to fly the aircraft may provide an element of redundancy. The power capability of each rotor may provide an element of redundancy wherein the rotors possess more power than is more than is required to fly the aircraft. The rotors may have a 1.3 to 1.6 thrust to weight ratio. The thrust to weight ratio may be designed to provide an element of redundancy. In some embodiments, in the event a rotor of the multiple rotors ceases to function the remaining rotors of the multiple rotors are sufficient to fly the aircraft in a level position. A rotor opposite a malfunctioning rotor may not be used in order to maintain balance in the aircraft. Motors used to rotate the rotors may have a maximum power of 10,000 to 15,000 watts, a diameter of 100 to 200 millimeters, or a weight of 2000 to 3000 grams. A rotor blade may have a length of 12 inches to 24 inches.

In some embodiments, the multiple rotors are angled to enhance torque in directional flight. The rotors may be angled to attain greater yaw authority or increased torque. For example, in the event the rotors are level, the aircraft pitches forward to create force as it flies forward. In the event the rotors are tilted forward, the aircraft does not need to pitch forward as far to achieve the same speed. Tilting the rotors may decrease a drag experienced by the aircraft. In some embodiments, some of the rotors are pitched forward whereas other rotors are pitched back. The rotors may be tilted at differing angles in order to efficiently move the aircraft in all directions. In the example shown rotors 500, 502, 512, and 506 may be tilted down such that the left side of the swept areas of the rotors as shown are at a lower altitude than the right side. Rotors 530, 504, 508, and 510 may be tilted or angled up.

In some embodiments, pairs of rotors of the multiple rotors rotate in opposite directions from each other to minimize torque. Each rotor produces a thrust and a torque about its center of rotation. With an equal number of rotors rotating in each direction, the aircraft's acceleration about the yaw axis may be canceled out. Rotating pairs of motors in opposite direction may allow an aircraft to hover without spinning. In the example shown, rotors 504, 508, 512, and 500 may rotate to the left whereas rotors 502, 506, 510, and 530 rotate to the right.

Figure 6:
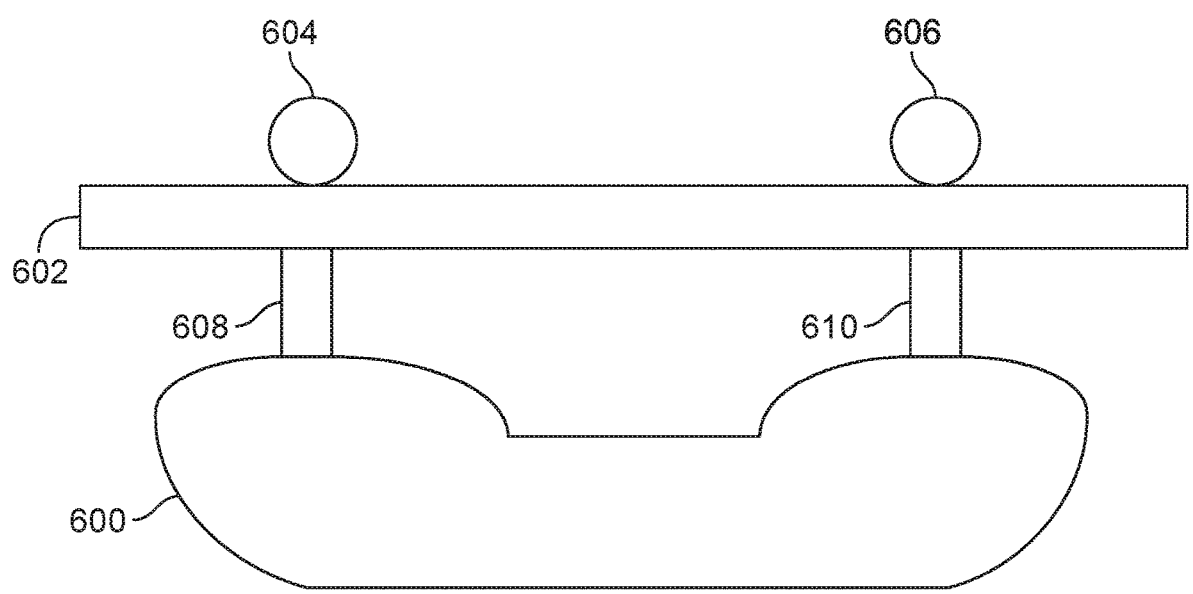
FIG. 6 is a diagram illustrating a side view of an embodiment of a multicopter with flotation landing gear.

FIG. 6 is a diagram illustrating a side view of an embodiment of a multicopter with flotation landing gear. In some embodiments, the multicopter aircraft is optimized to fly over water and comprises flotation devices. In the example shown boom 604 and boom 606 are attached perpendicularly to boom 602. In the example shown, flotation device 600 is attached to boom 602 via 608 and 610. In some embodiments, 608 and 610 are the same dimensions or are made of the same material as the booms. Structures 608 and 610 may comprise a metal cylinder, a tube, a pipe, or any appropriate connecting structure. In some embodiments, the flotation devices that are attached underneath junctures of booms of the aircraft. For example, structures 608 and 610 are directly underneath where boom 602 is attached to boom 604 and boom 606 respectively. In some embodiments, the positioning of the flotation device allows the fuselage to be stably supported. The joints or junctures may be reinforced.

In some embodiments, the flotation devices are filled with air. The juncture of structures 608 and 610 with flotation device 600 may be reinforced to ensure no air escapes from flotation device 600. The flotation devices may be made of a material that is lightweight, waterproof, and resistant to tears and punctures. The flotation devices may be sewn or constructed such that it maintains a desired shape despite being filled with air. The flotation devices may be concave. In the example shown, flotation device 600 has ends that curve up and away from the water. In some embodiments, the flotation devices are curved to minimize interference with the multiple rotors' wash. For example, a rotor may be attached under the left end of boom 602. The curvature of flotation device 608 near structure 608 may decrease the extent to which flotation device 600 blocks air pushed by the rotor.

Figure 7:
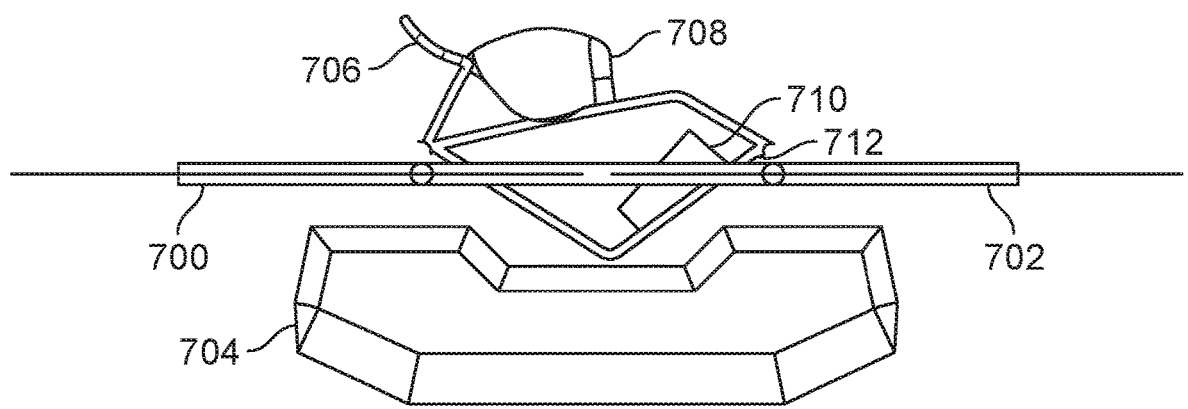
FIG. 7 is a diagram illustrating a side view of an embodiment of a multicopter with flotation landing gear.

FIG. 7 is a diagram illustrating a side view of an embodiment of a multicopter with flotation landing gear. In the example shown, the fuselage comprises steering mechanism 706 and tank 708. In the example shown, the tank and handlebars are attached to a fuselage frame. The frame may comprise metal tubing. In some embodiments, the fuselage is attached to a triangulated frame that prevents or reduces twisting. The frame may be designed to increase stiffness of the aircraft. In the example shown, frame 712 protrudes over rotors 70 and 702 in a triangular configuration. Steering mechanism 706 and tank 708 are attached to a same sloped side of the frame. In the example shown, frame 712 extends below rotors 700 and 702 in a triangular formation. The frame may provide space for storage, for example of the flight computer or batteries. In the example shown, batteries 710 are attached to frame 712. In some embodiments, components of the aircraft are waterproof or water resistant. For example, batteries 710 may be sprayed with a sealing coat or stored in an airtight box. Flotation device 704 is attached underneath rotors 700 and 702.

Figure 8:
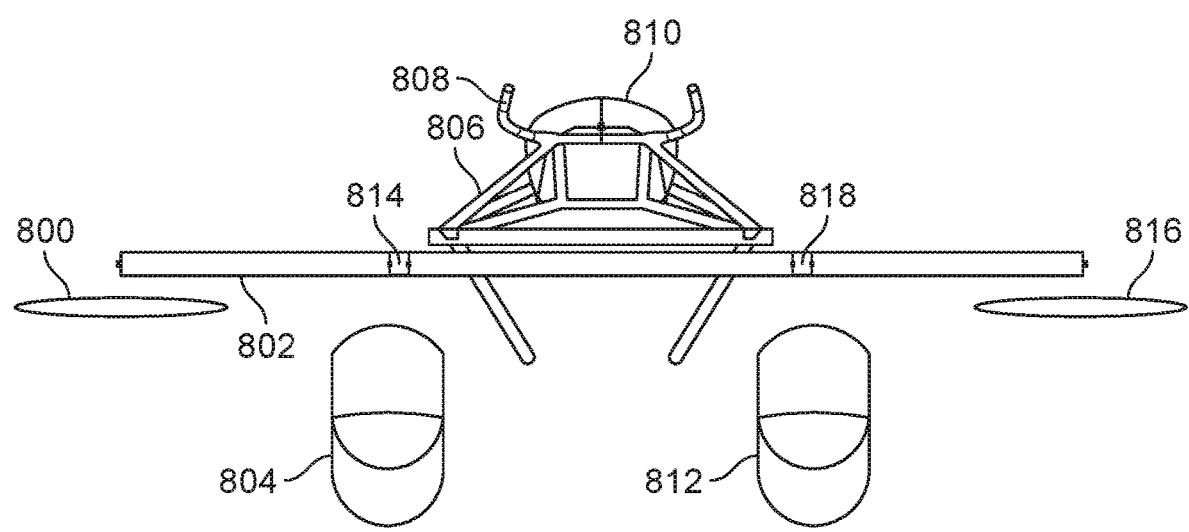
FIG. 8 is a diagram illustrating a front view of an embodiment of a multicopter with flotation landing gear.

FIG. 8 is a diagram illustrating a front view of an embodiment of a multicopter with flotation landing gear. In the example shown, rotors 800 and 816 are attached underneath boom 802. Booms 814 and 818 are perpendicular to boom 802. Flotation devices 804 and 812 are attached on either side of the aircraft. In the example shown, tank 810 and steering mechanism 808 are attached to frame 806. Steering mechanism 808 may comprise handlebars. In the example shown, two beams extend from the middle of steering mechanism 808. The two beams are then further attached to main supporting booms of the aircraft. In some embodiments, the fuselage frame is designed to be stiffened or resist contortion that occurs due to natural frequencies. Stiffening the frame may cause natural frequencies of the aircraft to be higher and easier to avoid.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A multicopter aircraft, comprising:
   multiple rotors, each mounted substantially horizontally on a distal end of a boom; and
   a plurality of removable boom extensions, each boom extension being associated with a corresponding boom and each boom extension being configured to extend an associated distal end of said corresponding boom by an amount determined based at least in part on a swept area associated with a rotor mounted at or near said associated distal end, wherein the boom extensions are adapted to receive a material extended over the booms to provide a barrier between an occupant of said aircraft and the multiple rotors.

2. The aircraft of claim 1, further comprising the material, wherein the material extends over a far end of at least one of the boom extensions to separate the occupant from the multiple rotors.

3. The aircraft of claim 1, wherein the material extends over swept areas associated with the multiple rotors.

4. The aircraft of claim 1, wherein the aircraft has a length of 100 inches or less.

5. The aircraft of claim 1, wherein the multiple rotors surround a fuselage of the aircraft.

6. The aircraft of claim 1, wherein a fuselage of the aircraft comprises a seat and a steering mechanism.

7. The aircraft of claim 1, further comprising a flight computer configured to prevent the aircraft from tilting past a threshold angle.

8. The aircraft of claim 1, further comprising two parallel booms and two booms perpendicular to the two parallel booms, wherein the two parallel booms are attached to the two perpendicular booms.

9. The aircraft of claim 1, further comprising two parallel booms and two booms perpendicular to the two parallel booms, wherein a fuselage is enclosed by the two parallel booms and the two perpendicular booms.

10. The aircraft of claim 1, wherein in the event a rotor of the multiple rotors ceases to function, the remaining rotors of the multiple rotors are sufficient to fly the aircraft in a level position.

11. The aircraft of claim 1, wherein pairs of rotors of the multiple rotors rotate in opposite directions from each other to minimize torque.

12. The aircraft of claim 1, wherein the multiple rotors are angled to enhance torque in directional flight.

13. The aircraft of claim 1, further comprising a fuselage with a triangulated frame that prevents or reduces twisting.

14. The aircraft of claim 1, wherein a fuselage of the aircraft is unenclosed.

15. The aircraft of claim 1, wherein the aircraft is optimized to fly over water.

16. The aircraft of claim 1, wherein the aircraft comprises flotation devices.

17. The aircraft of claim 1, wherein the aircraft comprises flotation devices that are attached underneath junctures of booms of the aircraft.

18. The aircraft of claim 1, further comprising flotation devices filled with air.

19. The aircraft of claim 1, further comprising flotation devices having curved ends.

20. The aircraft of claim 1, further comprising flotation devices that are curved to minimize interference with the multiple rotors' wash.

* * * * *